(12) United States Patent
Truemner et al.

(10) Patent No.: US 8,327,958 B2
(45) Date of Patent: Dec. 11, 2012

(54) ABRASIVE COMPACT OF SUPERHARD MATERIAL AND CHROMIUM AND CUTTING ELEMENT INCLUDING SAME

(75) Inventors: Christian James Truemner, Elkton, MI (US); Suresh Vagarali, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 13/262,250

(22) PCT Filed: Mar. 31, 2010

(86) PCT No.: PCT/US2010/029291
§ 371 (c)(1),
(2), (4) Date: Sep. 30, 2011

(87) PCT Pub. No.: WO2010/117823
PCT Pub. Date: Oct. 14, 2010

(65) Prior Publication Data
US 2012/0031675 A1 Feb. 9, 2012

Related U.S. Application Data

(60) Provisional application No. 61/165,151, filed on Mar. 31, 2009.

(51) Int. Cl.
*E21B 10/36* (2006.01)
(52) U.S. Cl. ..... 175/434; 175/428; 175/432; 175/420.2; 175/426
(58) Field of Classification Search ............... 175/434, 175/428, 432, 420.2, 426; 75/236, 241, 242
See application file for complete search history.

(56) References Cited

U.S. PATENT DOCUMENTS

| | | | |
|---|---|---|---|
| 2,947,609 | A | 8/1960 | Strong |
| 2,947,610 | A | 8/1960 | Hall et al. |
| 3,141,746 | A | 7/1964 | De Lai |
| 3,233,998 | A | 2/1966 | McKelvey |
| 3,236,615 | A | 2/1966 | Lipkin |

(Continued)

FOREIGN PATENT DOCUMENTS

CA 2451825 2/2008
(Continued)

OTHER PUBLICATIONS

Wentorf, R.H. Jr., "Diamond Formation at High Pressures", pp. 249-291, Schenectady, NY, USA.

(Continued)

*Primary Examiner* — Cathleen Hutchins
(74) *Attorney, Agent, or Firm* — Frank Gao; Maria Gasaway (57) ABSTRACT

Cutting elements having a substrate and a layer of superhard material sintered to the substrate are disclosed. The layer includes a working surface at a first surface. From the interface of the layer with the substrate, a reaction zone extends into the layer toward the working surface and a binder metal depletion zone extends into the substrate toward a base surface. The layer of superhard material has a composition including chromium or an alloy thereof. Also disclosed is an abrasive compact having a body with a composition including (i) a superhard material, (ii) a metal from a grain growth inhibitor or a metal from a metallic carbide other than WC, and (iii) an iron group binder metal. Cutting elements incorporating the abrasive compact, and drill bits incorporating abrasive compacts and cutting elements are also disclosed as well as methods of manufacture and methods of cutting material.

45 Claims, 7 Drawing Sheets

U.S. PATENT DOCUMENTS

| | | |
|---|---|---|
| 3,743,489 A | 7/1973 | Wentorf |
| 3,745,623 A | 7/1973 | Wentorf, Jr. et al. |
| 3,767,371 A | 10/1973 | Wentorf, Jr. et al. |
| 4,063,909 A | 12/1977 | Mitchell |
| 4,109,737 A | 8/1978 | Bovenkerk |
| 4,943,488 A | 7/1990 | Sung et al. |
| 4,983,212 A | 1/1991 | Iyori et al. |
| 5,056,382 A | 10/1991 | Clench |
| 5,151,107 A | 9/1992 | Cho et al. |
| 5,304,342 A | 4/1994 | Hall, Jr. et al. |
| 5,335,738 A | 8/1994 | Waldenstrom et al. |
| 5,348,108 A | 9/1994 | Scott et al. |
| 5,370,195 A | 12/1994 | Keshavan et al. |
| 5,374,854 A | 12/1994 | Chen |
| 5,441,817 A * | 8/1995 | Rai ................................ 428/551 |
| 5,512,235 A | 4/1996 | Cerutti et al. |
| 5,705,758 A | 1/1998 | Wakabayashi et al. |
| 5,766,394 A | 6/1998 | Anderson et al. |
| 5,820,985 A | 10/1998 | Chow et al. |
| 5,871,060 A | 2/1999 | Jensen |
| 5,880,382 A | 3/1999 | Fang et al. |
| 6,241,035 B1 | 6/2001 | Portwood |
| 6,260,640 B1 | 7/2001 | Einset et al. |
| 6,290,008 B1 | 9/2001 | Portwood et al. |
| 6,454,027 B1 | 9/2002 | Fang et al. |
| 6,616,725 B2 | 9/2003 | Cho |
| 6,651,756 B1 | 11/2003 | Costo, Jr. et al. |
| 6,696,137 B2 | 2/2004 | Yong |
| 6,892,836 B1 | 5/2005 | Eyre et al. |
| 6,915,866 B2 | 7/2005 | Middlemiss |
| 6,951,578 B1 | 10/2005 | Narushima |
| 7,017,677 B2 | 3/2006 | Keshavan et al. |
| 7,108,598 B1 | 9/2006 | Galloway |
| 7,150,897 B2 | 12/2006 | Mikus |
| 7,866,418 B2 | 1/2011 | Bertagnolli et al. |
| 8,020,645 B2 | 9/2011 | Bertagnolli et al. |
| 8,158,258 B2 | 4/2012 | Bertagnolli et al. |
| 2004/0140132 A1 * | 7/2004 | Middlemiss ................... 175/428 |
| 2007/0144790 A1 * | 6/2007 | Fang et al. .................... 175/434 |
| 2010/0212971 A1 * | 8/2010 | Mukhopadhyay et al. ... 175/428 |
| 2011/0067929 A1 * | 3/2011 | Mukhopadhyay et al. ... 175/432 |

FOREIGN PATENT DOCUMENTS

| | | |
|---|---|---|
| EP | 0389800 | 10/1990 |
| EP | 0596742 | 11/1994 |
| EP | 0701861 | 11/2004 |
| JP | 58199804 | 11/1983 |
| JP | 2600359 | 1/1997 |
| WO | 02024603 | 3/2002 |
| WO | 2005025805 | 3/2005 |
| WO | 2005110648 A2 | 11/2005 |
| WO | 2007017745 | 2/2007 |
| WO | 2006107628 A3 | 11/2007 |
| WO | 2007144733 A3 | 2/2008 |
| WO | 2007144731 A3 | 9/2008 |

OTHER PUBLICATIONS

Bulanova, G.P., "The Formation of Diamond", Journal of Geochemical Exploration, vol. 53 (1995) pp. 1-23.

* cited by examiner

ABRASIVE COMPACT OF SUPERHARD MATERIAL AND CHROMIUM AND CUTTING ELEMENT INCLUDING SAME

This application is a 371 of international application PCT/US10/29291 filed Mar. 31, 2010, which claims priority based on U.S. provisional patent application No. 61/165,151 filed Mar. 31, 2009.

FIELD

The present disclosure relates to an abrasive compact of integrally bonded superhard material and to a cutting element having a layer of integrally bonded superhard material disposed over a substrate. More particularly, the present disclosure relates to the composition and structure of the integrally bonded superhard material, the composition including, as an example, polycrystalline diamond (PCD)-Cr—Co. A rock drilling bit incorporating the abrasive compact and/or cutting element and a method of cutting a material using the abrasive compact and/or cutting element are also disclosed.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Superhard materials include, for example, diamond, cubic boron nitride and polycrystalline diamond. Diamonds and cubic boron nitride ("CBN") have been widely used as abrasives on saws, drills, and other tools that utilize the abrasive to cut, form, or polish other hard materials. Polycrystalline diamond ("PCD") cutting elements are generally known. A PCD compact is a mass of diamond particles, bonded together to form an integral, tough, high-strength mass. Diamond or CBN particles may be bonded together as a compact in a particle-to-particle self-bonded relationship, optionally with a bonding medium disposed between the particles, such as a catalyzing material used to bond the abrasive particles together. For example, U.S. Pat. Nos. 3,236,615; 3,141,746; and 3,233,988, the disclosures of each of which are herein incorporated by reference in their entirety, describe PCD compacts and methods of forming the same.

An abrasive particle compact may be bonded to a substrate material, such as cemented tungsten carbide. Compacts of this type, i.e., when bonded to a substrate, are sometimes referred to as composite compacts, such as the compacts described in U.S. Pat. Nos. 3,743,489; 3,745,623; and 3,767,371, the disclosures of each of which are herein incorporated by reference in their entirety, or are sometimes referred to as a cutting element or a cutter.

Abrasive compacts and composite compacts have found utility incorporated into drill bits. Drill bits for use in rock drilling, machining of wear resistant materials, and other operations which require high abrasion resistance or wear resistance generally consist of a plurality of abrasive compacts and/or composite compacts affixed to the drill bit or embedded into the body of the drill bit. For example, U.S. Pat. Nos. 4,109,737 and 5,374,854, the disclosures of each of which are herein incorporated by reference in their entirety, describe drill bits with a tungsten carbide substrate having a polycrystalline diamond compact on the outer surface of the cutting element.

Abrasive compacts and composite compacts incorporating superhard materials are used in drilling, mining, and woodworking applications. Abrasive compacts and composite compacts have been designed to provide variously, among other things, abrasion resistance impact strength, and/or advantageous thermal stability. Accordingly, abrasive compacts and composite compacts of all types may be mounted by various means, e.g., by interference fit, by brazing, by direct incorporation into the body of the bit or by other mounting methods, to form drill bits. Drill bits can, for example, include rotary drill bits, roller cone bits, and drag bits.

Drilling and mining operations, in particular, require a cutter system to withstand impacts observed in transitional drilling and drilling through tough formations. In addition, the wash of the drilling and/or cutting operation is very abrasive and contributes to wear of the cutter. As the performance of the superhard material such as PCD increases, so does the need to improve the performance of the substrate supporting the superhard material. For example, underperformance of the substrate relative to the superhard material in regards to wear can result in substrate wear that reduces the integrity of the mounting method and can result in failure of the cutter mounting that is premature relative to the time period in which the superhard material would otherwise fail or be exhausted. Further, cutters are typically rotated during a remounting operation to place a new wear edge into surface and thereby extend the life of the cutter as a whole. Two, three or more rotations may be available depending on cutter size before the cutter as a whole is exhausted. Remounting is usually accomplished by unbrazing and rebrazing the cutter, or by unmounting and remounting the cutter by other methods.

Figure 1:
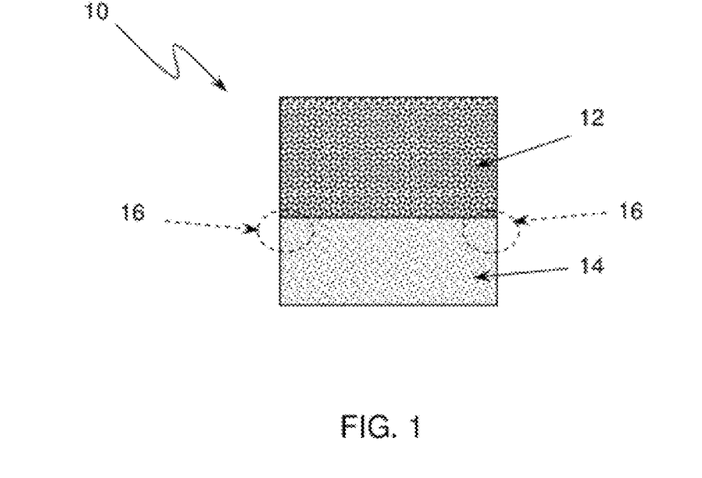
FIG. 1 is a general schematic cross-section of a conventional cutter showing the location of substrate wear.

However, if the substrate wears at a rate that is greater than the aggregate of the superhard material over the number of rotations, then support for the superhard material and an attachment area for remounting is not sufficient. This results in the cutter not being used to its maximum lifetime. FIG. 1 is a general schematic cross-section of a cutter 10 showing the superhard material 12 and the substrate 14 and illustrating the general areas of wear 16 that disadvantageously occurs on the substrate 14.

SUMMARY

Reducing the thermal mismatch at the interface between the substrate and superhard material of the cutter element, which arises from differences in the coefficient of thermal expansion, would enable the use of thicker or harder superhard layers. In this regard, a smoother and thicker transition in the coefficient of thermal expansion can be achieved by changing the substrate. In particular, this would be advantageous while using one diamond feed, although multilayered feeds can also suitably be used. It would be advantageous if, in addition to the other advantages of superhard material, an improved substrate was included in the cutter to improve lifetime of the cutter as a whole.

Exemplary embodiments of cutting elements comprise a substrate, a layer of superhard material sintered to the substrate, the layer including a working surface at a first surface, a reaction zone extending into the layer from an interface of the layer with the substrate toward the working surface, and a binder metal depletion zone extending into the substrate from the interface, wherein the layer of superhard material has a composition including chromium or an alloy thereof.

An exemplary embodiment of an abrasive compact comprises a body having a composition including (i) a superhard material, (ii) a metal from a grain growth inhibitor or a metal from a metallic carbide other than WC, and (iii) an iron group binder metal, the body including a working surface at a first side and a base surface at a second side, the first side opposite the second side.

An exemplary embodiment of a method of cutting a material comprises contacting a surface of the material with at least a portion of the working surface of one or more cutting elements and/or one or more abrasive compacts.

An exemplary method of manufacturing a cutting element comprises sintering a superhard material to a substrate in a high pressure/high temperature (HPHT) process, wherein the substrate prior to sintering is doped with a grain growth inhibitor or a metallic carbide other than WC, wherein, during sintering, a metal from the metallic grain growth inhibitor or a metal from the metallic carbide other than WC is transformed to an elemental form, and wherein, during sintering, carbon from the grain growth inhibitor or from the metallic carbide other than WC melts and precipitates as WC upon cooling.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Exemplary embodiments of cutting elements comprise a substrate and a layer of superhard material. The layer of superhard material includes a working surface at a first surface. At a second, opposing surface, the layer of superhard material is sintered to the substrate. The layer of superhard material has a composition including an iron group binder metal or alloy thereof and a metal from a metallic carbide other than WC or a metal from a grain growth inhibitor. In one example, the layer of superhard material has a composition including cobalt and chromium.

Figure 2:
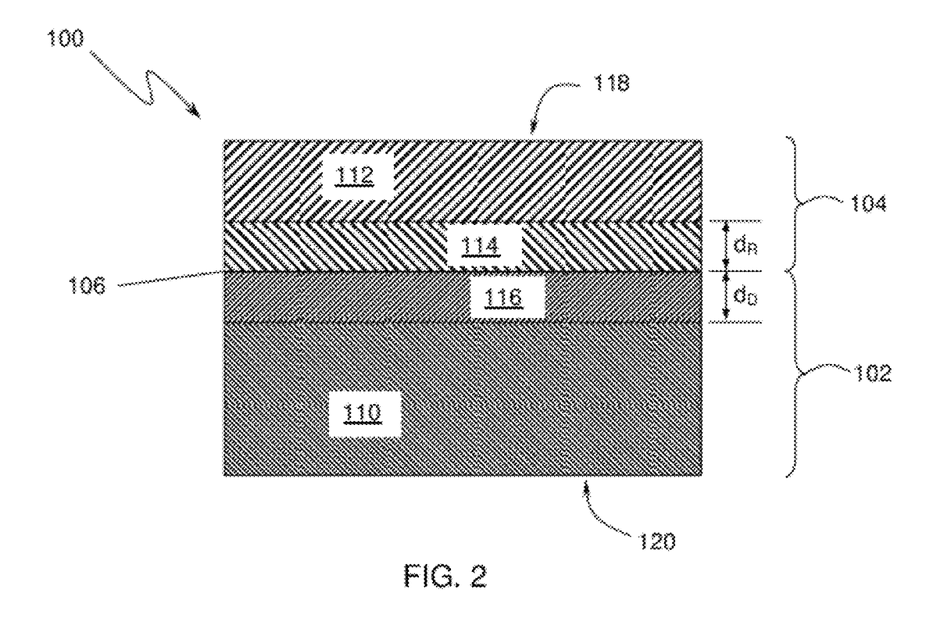
FIG. 2 is general schematic cross-section of an exemplary embodiment of a disclosed cutting element with a superhard material layer on a substrate.

FIG. 2 is general schematic cross-section of an exemplary embodiment of a disclosed cutting element 100. From FIG. 2, it is seen that the cutting element 100 includes a substrate 102 and a layer of superhard material 104 which meet at an interface 106. In the illustrated cutting element 100, a first region 110 in the substrate 102 remote from the interface 106 has a composition that is substantially bulk substrate material. Analogously, a second region 112 in the layer of superhard material 104 remote from the interface 106 has a composition that is substantially bulk superhard material. In the vicinity of the interface 106, there is a reaction zone 114 and a binder metal depletion zone 116.

Figure 3:
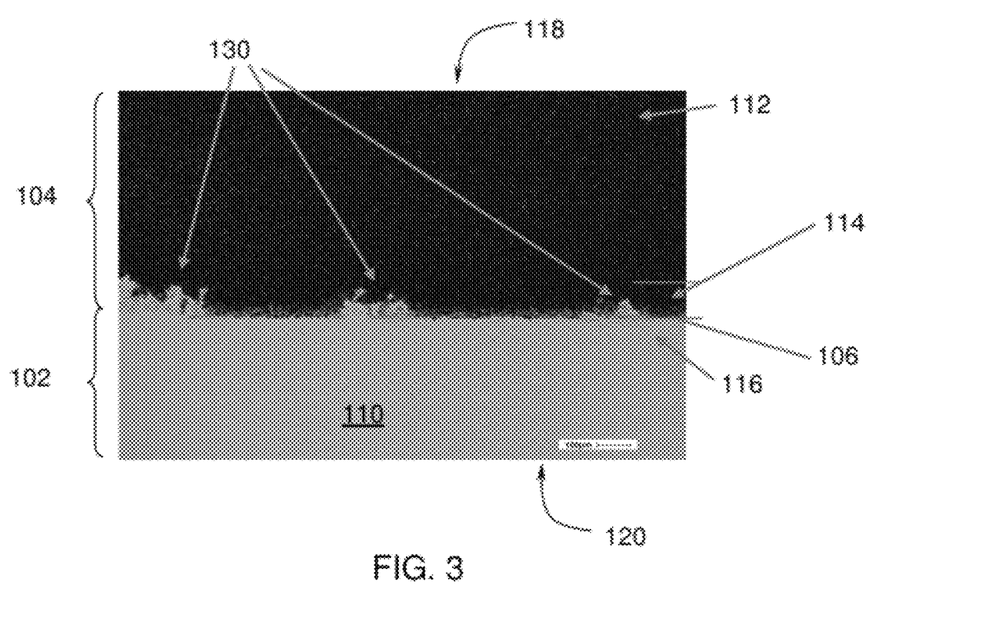
FIG. 3 is a SEM micrograph of a cross-section of an exemplary embodiment of a disclosed cutting element showing the substrate, the layer of superhard material, the interface of the substrate and the layer of superhard material, and the reaction zone.

FIG. 3 is a SEM micrograph of a cross-section of an exemplary embodiment of a cutting element showing the substrate, the layer of superhard material, the interface of the substrate and the layer of superhard material, the reaction zone and the depletion zone. The reaction zone 114 extends from the interface 106 of the layer 104 with the substrate 102 into the layer of superhard material 104 toward the working surface 118 of the cutting element 100. The binder phase depletion zone 116 extends from the interface 106 of the layer 104 with the substrate 102 into the substrate 102 toward the base surface 120 of the cutting element 100.

The two zones 114,116 form during manufacturing, such as by processing at high temperature and high pressure (HPHT). An example of a HPHT process is disclosed in U.S. Pat. No. 5,512,235, the entire contents of which are incorporated herein by reference. During manufacturing, the iron group binder metal in the substrate 102 is swept into the layer of superhard material 104 under pressure and temperature resulting in the iron group binder metal from the substrate 102 moving into the layer of superhard material 104 and carbon from the layer of superhard material 104 migrating into the substrate 102. This results in the reaction zone 114 being rich in iron group binder metal and the depletion zone 116 being poor in iron group binder metal. The penetration depth into the respective zones of the rich and poor concentrations before a bulk equilibrium is established contributes to defining the depth ($d_R$) of the reaction zone 114 and the depth ($d_D$) of the depletion zone 116. Thus, in some respects, the reaction zone 114 and the depletion zone 116 are compositional terms whereas the interface 106 is a geometric term. Further, the volume of the reaction among the superhard material, the iron group binder metal and the substrate material present at the original geometric interface defines the reaction zone interface.

A typical depth ($d_R$) of the reaction zone 114 measured normal from the interface 106 toward the working surface 118 is about 100 microns (±about 10%), alternatively greater than about 50 microns (±about 10%), greater than about 150 microns (±about 10%), or about 100 microns (±about 10%) to about 200 microns (±about 10%). The depth ($d_R$) of the reaction zone 114 can vary based on the processing conditions and grain size of the diamond feed. For example, as the pressure increases in the HPHT process, the depth of the reaction zone decrease; as the temperature increases in the HPHT process, the depth of the reaction zone increases. Also for example, as the average grain size of the diamond in the diamond feed increases, the depth of the reaction zone increase; as the average grain size of the diamond in the diamond feed decreases, the depth of the reaction zone decreases.

A typical depth ($d_D$) of the depletion zone 116 measured from the interface 106 toward the base surface 120 is generally greater than the depth ($d_R$) of the reaction zone 114.

Along with movement of the iron group binder metal, metal from the metallic grain growth inhibitor and/or metal from the metallic carbide other than WC present in the substrate migrates from the substrate into the layer of superhard material. Compositionally, these metals establish a similar depletion zone and reaction zone to that of the iron group binder metal. Both the original geometric interface and the reaction zone interface are illustrated in the SEM micrograph in FIG. 3.

Figure 4:
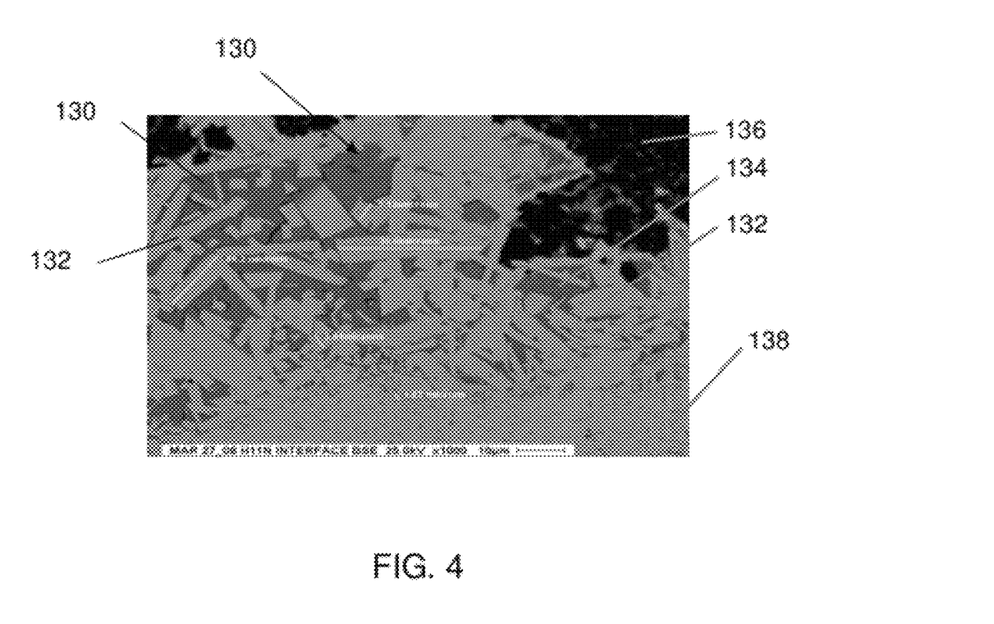
FIG. 4 is a SEM micrograph showing the microstructure in the reaction zone.

FIGS. 3 and 4 are Scanning Electron Microscope (SEM) micrographs showing the microstructures in the reaction zone. The reaction zone 114 includes eruptions 130 of material from the substrate 102 penetrating into the layer of superhard material 104. These eruptions 130 are seen in both FIG. 3 and FIG. 4. The eruptions 130 include WC and iron group binder metal from the substrate. The WC forms grains 132 in the reaction zone 104 and vary in diameter from about 3 microns to about 30 microns.

Dispersed throughout the reaction zone is the iron group binder metal 134. In the micrograph in FIG. 4, the WC is displayed as light gray and the iron group binder metal (in this case Co) is displayed as medium gray. Also visible in the micrograph in FIG. 4 is the beginning of the bulk volume of the layer of superhard material 136 (in this case polycrystalline diamond) shown in black and the beginning of the bulk volume of the substrate 138 (in this case a WC substrate having a grain size ($d_{50}$) of about 2 to about 3 microns).

Figure 5A:
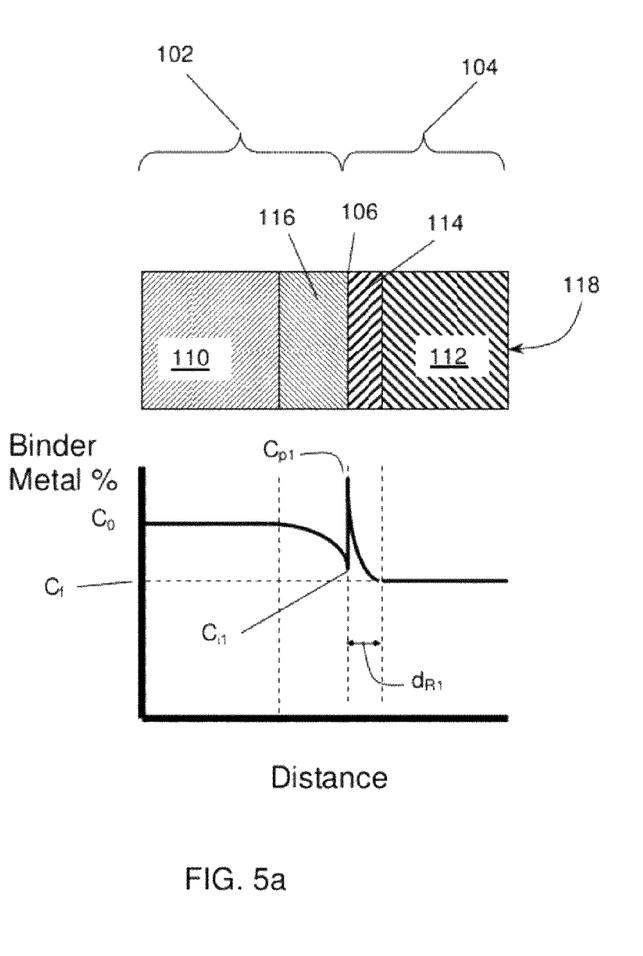
FIGS. 5a and 5b compare the binder metal content as a function of position in a conventional cutting element (FIG. 5a) and an exemplary embodiment of a cutting element as disclosed herein (FIG. 5b).
Figure 5B:
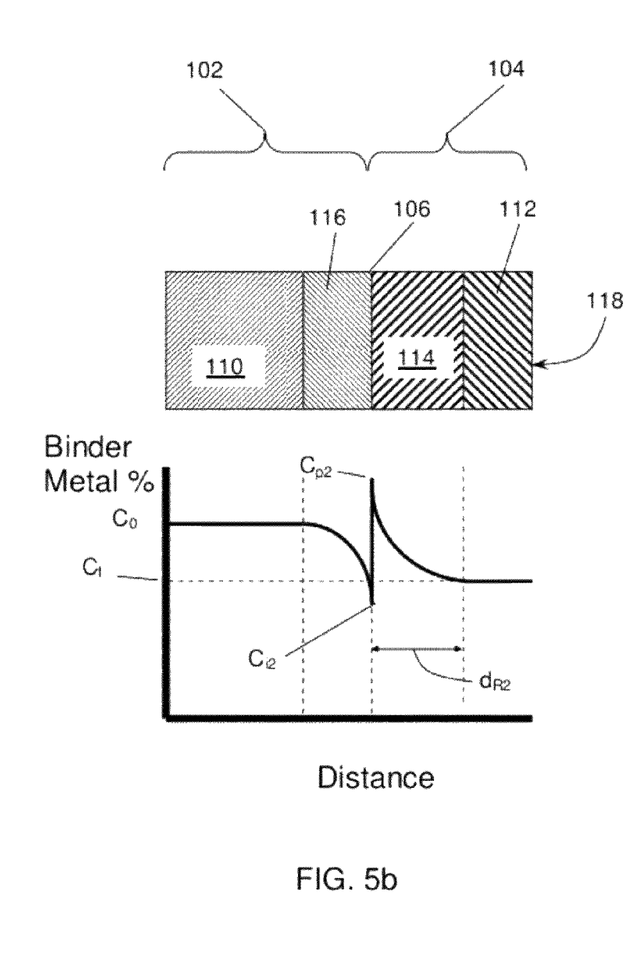

FIGS. 5a and 5b show the iron group binder metal content as a function of position in a conventional PCD cutting element (FIG. 5a) and an exemplary embodiment of a PCD cutting element as disclosed herein (FIG. 5b). In FIGS. 5a and 5b, the content of the iron group binder metal in the substrate 102 begins at an initial level ($C_0$) in the first region 110, which substantially represents the bulk concentration in the substrate 102. The iron group binder metal includes any other metal or nonmetal additives that may migrate, sweep into, or dissolve in the iron group metal during initial sintering of the substrate. Typical additions to hardmetal substrates include carbides, nitrides, or carbonitrides of Cr, Nb, Mo, Ta, Ti or V. Nonmetal additions could be B, S, or Si. In the depletion zone 116, the concentration of the iron group binder metal decreases due to the migration of the iron group binder metal to the reaction zone 114 as well as dilution from carbon from the layer of superhard material 104 migrating into the substrate 102 to a concentration ($C_{i1}$ and $C_{i2}$, respectively for FIG. 5a and FIG. 5b) at the interface 106. On the superhard material layer side of the interface 106, the concentration of the iron group binder metal peaks ($C_{p2}$ and $C_{p2}$, respectively for FIGS. 5a and 5B) and decreases to a final level ($C_f$) in the second region 112, which substantially represents the bulk concentration in the layer of superhard material 104. In the reaction zone 114, the concentration of the iron group binder metal is larger than in other regions of the layer of superhard material 104 due to the migration of the iron group binder metal to the reaction zone 114 as well as dilution from carbon from the layer of superhard material 104 migrating into the substrate 102.

Assuming the same iron group binder metal content in the substrate, the same diamond feed, and the same HPHT conditions, the final concentration of iron group binder metal in the layer of superhard material is not altered. However, the thickness of the reaction zone ($d_R$) of this invention is thicker than in the conventional product (compare FIG. 5b to FIG. 5a). Increasing the thickness of the reaction zone ($d_R$) is accomplished by using a substrate with a lower carbon content (FIG. 5b). The carbon starved binder metal dissolves more diamond closer to the interface. This results in a more gradual transition of the concentration of iron group binder metal and metal from the metallic grain growth inhibitor or from the metallic carbide other than WC so that the overall coefficient of thermal expansion has a more gradual change through the reaction zone.

The iron group binder metal decreases as the interface is approached from the substrate side. This is due to binder metal being extruded into the layer of superhard material during the sweep process. Once directly at the interface, the content of iron group binder metal theoretically approaches 100%. Then, the iron group binder metal content decreases to a constant value as the position moves further from the interface toward the working surface 118. In this example, bulk binder metal concentration of the substrate is higher than that of the bulk binder metal concentration of the superhard phase.

The iron group binder metal concentration may be quite different between the conventional cutting element (FIG. 5a) and the inventive cutting element (FIG. 5b) disclosed herein. For example, in exemplary embodiments of the cutting element the depth of the reaction zone ($d_{R2}$) is greater than the depth of the reaction zone ($d_{R1}$) observed in the conventional cutting element. Also for example, the concentration at the interface ($C_{i2}$) in exemplary embodiments of the cutting element is lower than the concentration at the interface ($C_{i1}$) in the conventional cutting element.

Depending on the application, it may be desirable to have the content of the iron group binder metal higher in the layer of superhard material than in the substrate. The iron group binder metal content of the diamond layer can be adjusted relative to the substrate to achieve a favorable difference in thermal expansion coefficient by, for example, adjusting the HPHT pressure, adding iron group metals to the diamond feed, or using multimodal feeds.

Typical practice for making PCD involves using substrates that are nearly saturated with carbon. As the carbon content increases, the melting point of the iron group binder metal is lower. In contrast here, using a grain growth inhibitor, such as, for example, chromium carbide, results in a substrate with a lower and more stable melting point, which allows substrates with a lower carbon level to be used at similar HPHT conditions to conventional substrates.

The cutting elements disclosed herein can be processed to have at least a portion, alternatively, a major portion or substantially a complete portion, of the iron group binder metal in the superhard material 104 removed, leaving intact an interconnected body of the superhard material 104. This interconnected body is porous or semi-porous. The extent to which the iron group binder metal is removed from the superhard material 104 can be expressed as depth, measured normal to the working surface of the cutting element. Exemplary leach depths are generally greater than about 50 microns to about 90 microns, or about 50 microns to about 100 microns, or about 100 microns to about 400 microns, or about 120 microns to about 400 microns, or about 120 microns to about 300 microns, or about 150 microns to about 250 microns. Caution must be exercised during removal of the iron group binder metal so that the binder metal in the region of the reaction zone 114 is not removed as such removal may weaken the strength of the interface between the superhard material 104 and the substrate 102.

In one example, the superhard material 104 is exposed to an acid solution, such as a hydrochloric acid-based solution. Exposure can be limited to the superhard material 104 by using suitable masking or other protective techniques, such as epoxy, tubing and so forth. Acid solutions at elevated temperatures increase the reaction rate of the binder removal. Alternative embodiments could use leaching procedures as known in the art, including for example, as disclosed in U.S. Pat. No. 4,224,380, the disclosure of which is herein incorporated by reference in its entirety.

The concentrations of different components in the substrate and in the layer of superhard material have also been investigated empirically. It has been found that, in the reaction zone 114, a concentration of the iron group binder metal and a concentration of the metal from the grain growth inhibitor both decrease from the interface toward the working surface 118. This decrease in the concentrations is exponential and approaches a limit, which is the concentration of iron group binder metal at the working surface. Further, the concentration of iron group binder metal is substantially uniform (±about 10%) within the layer of superhard material 104 outside of the reaction zone 114. The concentration of the metal from the grain growth inhibitor is also substantially uniform (±about 10%) within the layer of superhard material 104 outside of the reaction zone 114. The composition of the binder alloy has been determined to be substantially consistent throughout the cutting element. This is a result of the binder alloy being formed during sintering of the substrate. For example, if the composition of the binder alloy in the substrate includes about 5 wt % Cr (or other metal as disclosed herein) in Co (or other iron group binder metal as disclosed herein), then, after HPHT processing, the binder alloy composition throughout the cutting element, i.e. the substrate and the layer of superhard material, would also include about 5 wt % Cr (or other metal as disclosed herein) in Co (or other iron group binder metal as disclosed herein).

In exemplary embodiments, the iron group binder metal is cobalt (Co) and the superhard material is polycrystalline diamond (PCD). It is expected that similar results would be seen for iron group binder metals other than Co, e.g., Fe and Ni. It is also expected that similar results would be seen for superhard materials other than PCD, e.g., PCBN.

Figure 6:
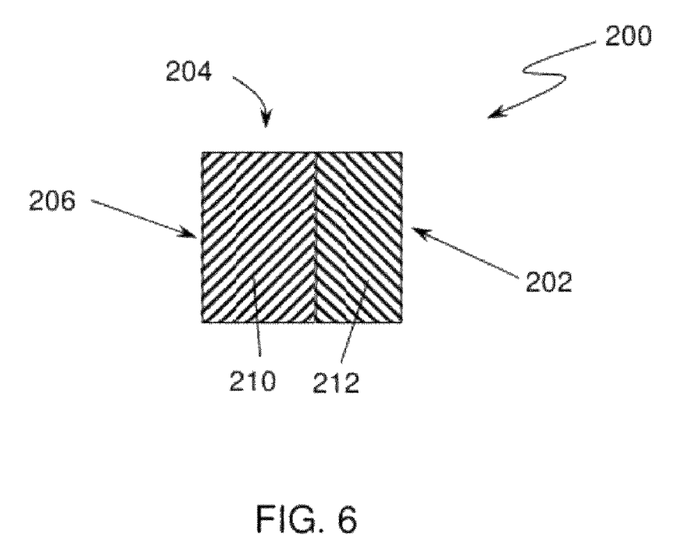
FIG. 6 is general schematic cross-section of an exemplary embodiment of a disclosed abrasive compact formed from a superhard material layer.

Exemplary embodiments of abrasive compacts comprise a body having a composition including a superhard material. FIG. 6 is general schematic cross-section of an exemplary embodiment of a disclosed abrasive compact formed from a superhard material. The abrasive compact 200 has a working surface 202 on the first surface of a body 204 and a bottom surface 206 on the second, opposing surface.

The body has a composition including (i) a superhard material, (ii) a metal from a grain growth inhibitor or a metal from a metallic carbide other than WC, and (iii) an iron group binder metal. In exemplary embodiments, the metal from the grain growth inhibitor is one or more of Cr, V, Ti, Nb, Mo, and Ta, alternatively Cr, and the metal carbide other than WC is one or more of $Cr_3C_2$, VC, $Mo_2C$ and TaC, alternatively VC and/or $Cr_3C_2$. In an alternative exemplary embodiment, the metal from the grain growth inhibitor is one or more of Cr and V and the metal from the metal carbide other than WC is one or more of Cr and V. In another alternative exemplary embodiment, the superhard material is polycrystalline diamond, the metal from a grain growth inhibitor or the metal from a metallic carbide other than WC is one or more of Cr and V, and the iron group binder metal is Co.

Figure 7:
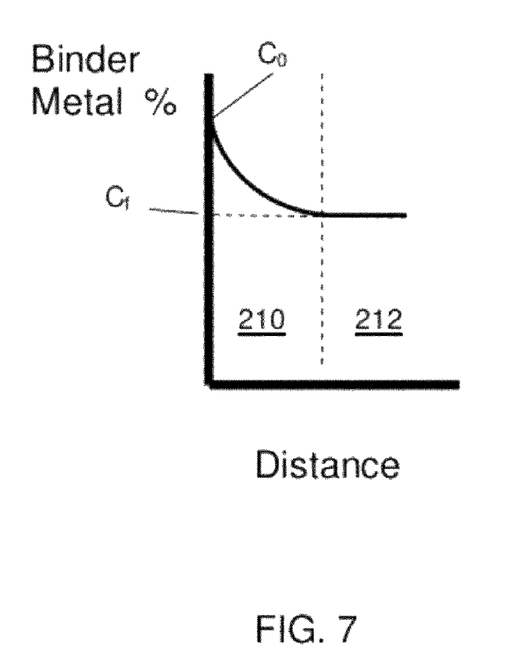
FIG. 7 shows the content of the binder metal as a function of position in an exemplary embodiment of an abrasive compact as disclosed herein.

FIG. 7 shows the content of the iron group binder metal as a function of position in an exemplary embodiment of an abrasive compact as disclosed herein. In generally, there are two regions in the abrasive compact. In a first region 210, the concentration of the iron group binder metal decreases from the base surface 206 toward the working surface 202. In a second region 212, the concentration is substantially constant and represents a bulk concentration in the layer of superhard material.

Similar to the concentrations shown for the layer of superhard material in the cutting element (see, FIG. 5*b*), in the abrasive compact 200, the concentration of the iron group binder metal and a concentration of the metal from the grain growth inhibitor or from the metallic carbide other than WC both decrease from the bottom surface 206 toward the working surface 202. This decrease is exponential and approaches a limit toward the working surface.

In the layer of superhard material both in exemplary embodiments of cutting elements and in exemplary embodiments of abrasive compacts, the metal from the grain growth inhibitor or the metal from the metallic carbide other than WC is present in an amount below a solubility limit of the metal in the iron group binder metal. This limit on the amount of metal contributes to avoiding film formation on diamond and contributes to avoiding carbide precipitates in the superhard material layer. Films can interfere with diamond to diamond bonding. Chromium and titanium are known to co-crystallize with diamond (see, H. Wentorf, "Diamond Formation at High Pressures"; Adv. High Press. Res., 4 (1974) pp. 249-281). Metal carbide films could result in metal carbide to metal carbide bonding, which is weaker than diamond to diamond bonding. Formation of metal carbide precipitates in the layer of superhard material can also act as defects, or otherwise lower the wear resistance, if present in sufficient quantity and, therefore, should be minimized. Therefore, the metal alloying elements of the binder composition are kept below their respective solubility limits for the iron group binder metal used in the binder composition.

Figure 8:
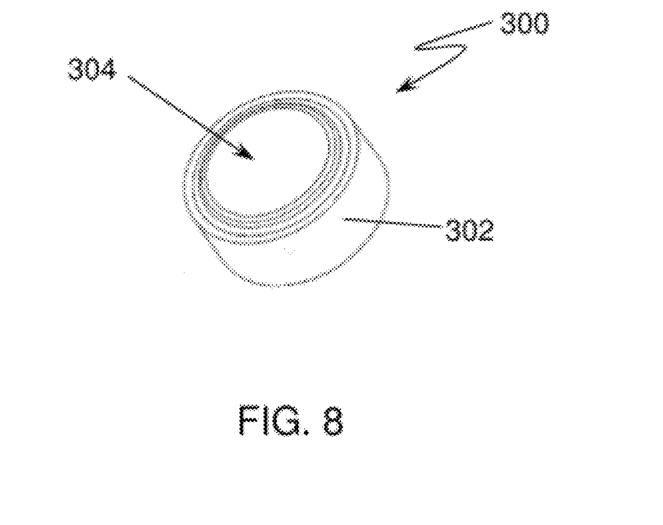
FIG. 8 is a side perspective view of an exemplary embodiment of a substrate showing the face which contacts the layer of superhard material.

FIG. 8 is a side elevation view of an exemplary embodiment of a substrate showing the face which contacts the layer of superhard material. The substrate 300 is a body 302 or other structure with a face 304 on which a layer of superhard material 104 can be integrally formed by, for example, HPHT sintering, or on which an abrasive compact 200 can be attached. The face 304 in FIG. 8 has a concentric stepped structure of elevations to promote adhesion of the layer of superhard material on the substrate, but other structures can be used for this purpose as well.

The substrate 300 has a composition including an iron group binder metal, a metal from (i) a grain growth inhibitor or (ii) a metallic carbide other than WC, and balance WC. In exemplary embodiments, the iron group binder metal can be selected from the group of Co, Fe, and Ni. Also, in exemplary embodiments, the metal from the grain growth inhibitor is one or more of Cr, V, Ti, Nb, Mo, and Ta, alternatively Cr. In exemplary embodiments, the metallic carbide other than WC is one or more of $Cr_3C_2$, VC, $Mo_2C$ and TaC, alternatively VC and $Cr_3C_2$. In one particular exemplary embodiment, the substrate has a combination in which the metal from the grain growth inhibitor is one or more of Cr and the metallic carbide other than WC is one or more of $Cr_3C_2$ and VC.

In one exemplary embodiment, the substrate is a tungsten carbide substrate with about 5 to about 20 wt % Co and about 0.1 to about 5 wt % Cr having WC grains in a Co matrix and the composition of the layer of superhard material is PCD diamond —Cr—Co with greater than or equal to about 93 wt % PCD, about 0. to about 5 wt % Cr, and the balance Co. The average grain size of the diamond particle is about 60 microns (±about 10%) or less, alternatively about 40 to about 60 microns, about 30 to about 50 microns, or about 20 to about 50 microns. In alternative embodiments, the substrate includes about 0.1 to about 3 wt % Cr, alternatively about 0.4 to about 1 wt % Cr, about 0.5 wt % Cr (±about 10%), and the layer of superhard material includes about 0.1 to about 3 wt % Cr, alternatively about 0.4 to about 1 wt % Cr, about 0.5 wt % Cr (±about 10%).

Figure 9:
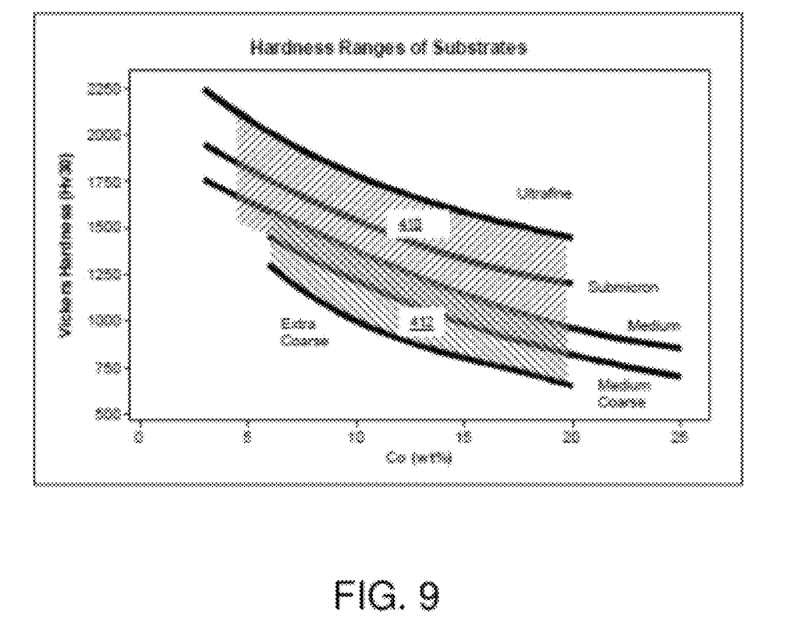
FIG. 9 is a graph showing the hardness (HV30) as a function of Co-content (wt %) for substrates having different average grain size of WC.

FIG. 9 is a graph showing the hardness (HV30) as a function of Co-content (wt %) and grain size for an exemplary embodiment of a substrate as disclosed herein. Substrates of WC can have average grain sizes ranging from about 2 micron ("Medium Fine") to greater than about 5 micron ("Extra Coarse"), and Co ranging from about 6 to about 20% (see, range 412 in FIG. 9).

Exemplary embodiments of the substrate disclosed herein have an average WC grain size less than about 4 micron ("Medium Coarse"), alternatively less than about 3 microns ("Medium") (see, range 410 in FIG. 9), a grain growth inhibitor and/or a metallic carbide other than WC, and Co ranging from about 6 to about 20 wt (±about 10%), alternatively about 10 to about 15 wt % (±about 10%). The use WC with a finer average grain size in conjunction with a grain growth inhibitor allows for greater changes in hardness with the same amount of Co. A suitable substrate is Sandvik H11N which has about 11 wt % Co, and a medium grain size. Alternatively, exemplary embodiments employ grain sizes that are medium to extra fine, i.e., about 3 to about 0.4 microns, alternatively about 2 to about 0.8 microns (±about 10%).

It has unexpectedly been found that the selection of an average WC grain size and iron group binder concentration as discussed above that provides a harder substrate can provide a cutting element with a substrate that has unexpectedly good wear properties. As a result, the cutting element can be mounted and remounted multiple times and multiple locations on the layer of superhard material can be placed into operation, thereby improving the lifetime, performance and efficiency of the disclosed cutting elements.

The abrasive compact and the cutting element can be incorporated into a rock drilling bit. Brazing is a conventional technique for attaching the cutting element to the drill bit. Direct mounting or incorporation into the body of the drill bit is a technique to attach the abrasive compact directly to a drill bit. In an exemplary embodiment, the rock drilling bit is drag bit.

Figure 10A:
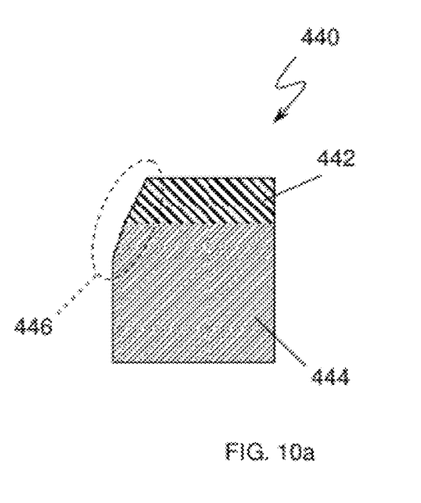
FIG. 10a shows a cross-section of a cutting element with a substrate that can be rotated for remounting and FIG. 10b shows a cross-section of a conventional cutting element with a substrate that is worn and cannot be rotated for remounting.
Figure 10B:
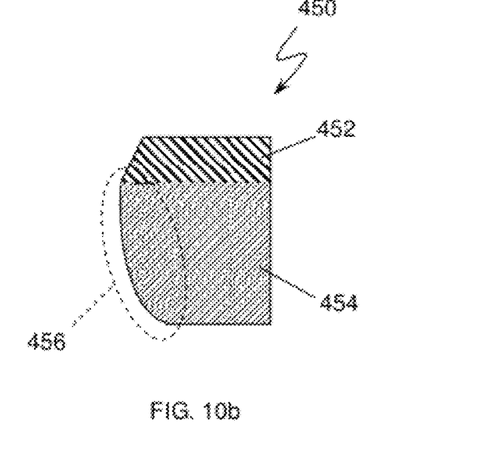

FIG. 10 illustrates the wear of the substrate relative to the diamond table. FIG. 10a depicts the cross-section of cutting element 440 that has worn in an ideal manner. In this case, the layer of superhard material 442 and substrate 444 have a wear pattern 446 that is substantially a line due to angled contact during use. Those areas of the substrate 444 not in direct contact with the internal diameter of the hole being cut are intact. FIG. 10b depicts what is observed with conventional substrates 450. In this example, the substrate 454 has been noticeably worn in an area 456 behind the layer of superhard material 452. The wear is believed to be the result of chips formed from the cutting operation swirling around the cutter, e.g., wash. Harder substrates as disclosed herein mitigate, if not prevent, this kind of wear.

Figure 11:
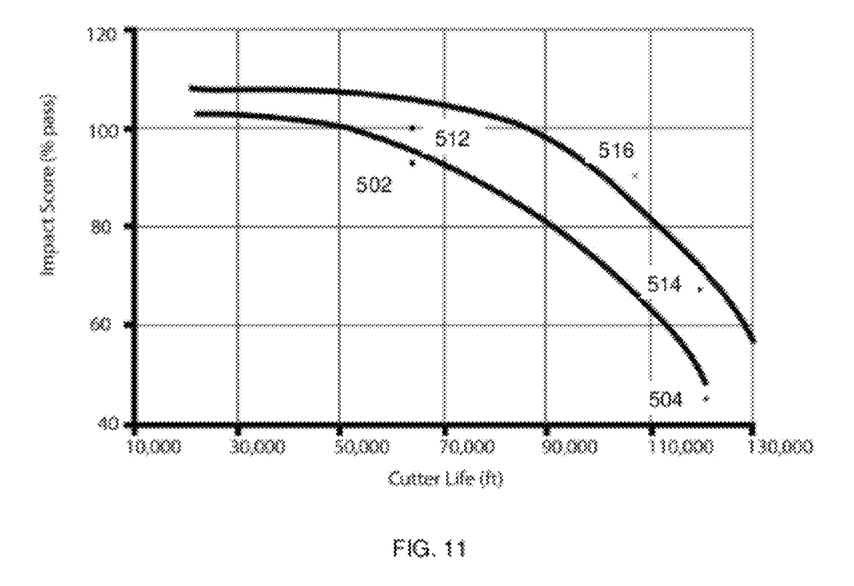
FIG. 11 shows the impact score as a function of cutter life for exemplary embodiments of cutting elements disclosed herein and for conventional cutting elements.

FIG. 11 illustrates the results of Impact Score and Vertical Turret Lathe (VTL) Testing. Results for cutting elements with a conventional substrate and with polycrystalline diamond as the layer of superhard material layer are shown at samples 502 and 504. The average grain size for the polycrystalline diamond feedstock for sample 502 was about 40 to about 50 microns; the average grain size for the polycrystalline diamond feedstock for samples 504 was about 15 to about 25 microns. Samples 512 and 514 are the results for cutting elements made with the same diamond feedstock as for samples 502 and 504, respectively. However, for sample 502 and 504 a conventional substrate was used and, for samples 512 and 514, the substrate is an exemplary substrate as described herein, e.g., contains Cr. Specifically, the substrate for samples 512 and 514 contained about 11 wt % Co and about 0.5 wt % Cr. The impact score for samples 512 and 514 are much improved over samples 502 and 504. Finally, sample 516 had the same substrate as samples 512 and 515, but used a feedstock that included polycrystalline diamond with an average grain size of about 25 to 40 microns. Sample 516 represents an improvement over conventional cutting elements in that, for example, the impact score for sample 516 is approximately double that of sample 504 but the cutting element lifetime is only about 10% less.

Figure 12A:
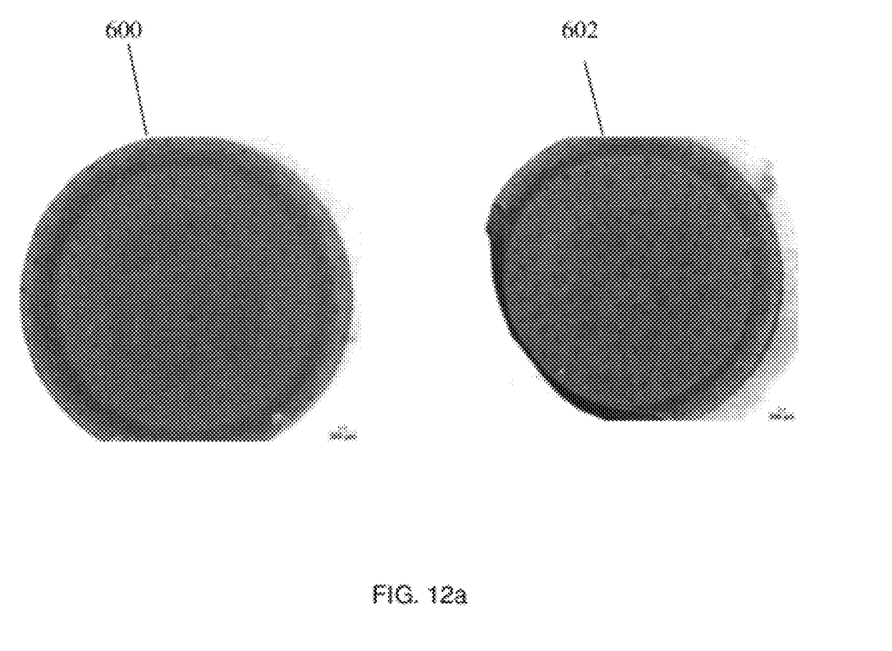
FIGS. 12a and FIG. 12b illustrate the superhard layer which has been removed from the substrate.

FIG. 12a shows the superhard layers 600, 602 which have been removed from the substrates. The black spots on the superhard layers 600, 602 are indicative of deep eruptions. Eruptions are generally caused by localized areas of low melting point iron group binder metal. When these areas melt, they extrude into the superhard layer with enough force to displace the superhard grains during HPHT sintering. Both of the superhard layers 600, 602 were sintered on a substrate having 13% Co and medium coarse WC.

Figure 12B:
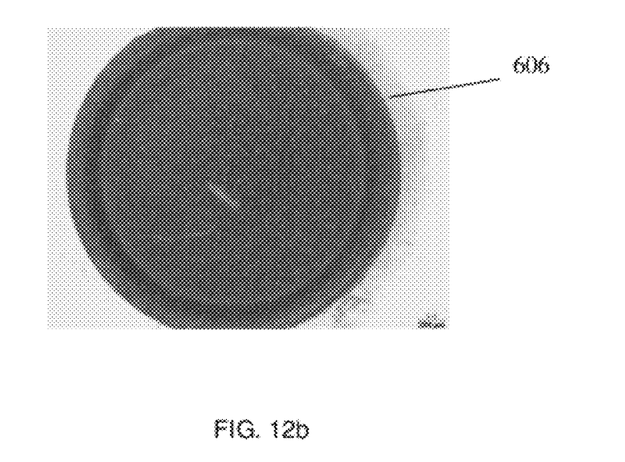

FIG. 12b shows the superhard layer 606 made with the inventive substrate. The inventive substrate consists of 11% Co and a medium WC. The inventive substrate reduces the frequency and depth of the eruptions. The white spots on the superhard layer 606 are indicative of shallow, less frequent eruptions.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutting element, comprising:
   a substrate;
   a layer of superhard material sintered to the substrate, the layer including a working surface at a first surface;
   a reaction zone extending into the layer from an interface of the layer with the substrate toward the working surface; and
   a binder metal depletion zone extending into the substrate from the interface,
   wherein the layer of superhard material has a composition including chromium or an alloy thereof that mixes with a binder metal in the substrate, wherein the binder metal at the interface is at a first concentration, and is at a second concentration away from the interface, wherein the second concentration is lower than the first concentration.

2. The cutting element of claim 1, wherein the superhard material is polycrystalline diamond (PCD).

3. The cutting element of claim 1, wherein the substrate includes a composition including an iron group binder metal, a metal from (i) a grain growth inhibitor or (ii) a metallic carbide other than WC, and balance WC.

4. The cutting element of claim 3, wherein the iron group binder metal is Co.

5. The cutting element of claim 3, wherein the metal from the grain growth inhibitor is one or more of Cr, V, Ti, Nb, Mo, and Ta.

6. The cutting element of claim 3, wherein the metallic carbide other than WC is one or more of $Cr_3C_2$, VC, $Mo_2C$ and TaC.

7. The cutting element of claim 3, wherein the metal from the grain growth inhibitor is one or more of Cr and V and wherein the metallic carbide other than WC is one or more of $Cr_3C_2$ and VC.

8. The cutting element of claim 3, wherein, in the layer of superhard material, the metal from the grain growth inhibitor or the metal from the metallic carbide is present in an amount below a solubility limit of the metal in the iron group binder metal.

9. The cutting element of claim 3, wherein in the reaction zone, a concentration of the iron group binder metal and a concentration of the metal from the grain growth inhibitor or the metal from the metallic carbide both decrease from the interface toward the working surface.

10. The cutting element of claim 9, wherein the concentration of iron group binder metal is substantially uniform within the layer outside of the reaction zone.

11. The cutting element of claim 3, wherein a ratio of the metal from the grain growth inhibitor to the iron group binder metal is substantially constant throughout the cutting element or a ratio of the metal from the metallic carbide to the iron group binder metal is substantially constant throughout the cutting element.

12. The cutting element of claim 1, wherein the substrate is a tungsten carbide substrate with 5-20 wt % Co and 0.1-5 wt % Cr.

13. The cutting element of claim 12, wherein an average grain size of the WC is about 0.4 to about 3 microns.

14. The cutting element of claim 1, wherein the substrate is a tungsten carbide substrate with about 10 to about 15 wt % Co and 0.4 to about 1 Wt % Cr and wherein an average grain size of the WC is about 0.8 to about 2 microns.

15. The cutting element of claim 14, wherein a thickness of the reaction zone is at least about 100 microns.

16. The cutting element of claim 1, wherein the layer of superhard material includes polycrystalline diamond having an average grain size of about 20 microns or less and about 0.5 wt % Cr.

17. The cutting element of claim 16, wherein the substrate is a tungsten carbide substrate with 5-20 wt % Co and 0.1-5 wt % Cr and wherein an average grain size of the WC is about 0.4 to about 3 microns.

18. A rock drilling bit comprising the cutting element of claim 1.

19. The rock drilling bit of claim 18, wherein the rock drilling bit is a drag bit.

20. The cutting element of claim 1, wherein at least a portion of an iron group binder metal present in the layer of superhard material is removed.

21. The cutting element of claim 1, wherein an iron group binder metal is removed from the layer of superhard material to a depth from the working surface of at least about 50 microns.

22. The cutting element of claim 21, wherein the depth from the working surface is about 50 microns to about 250 microns.

23. The cutting element of claim 21, wherein a region of the layer of superhard material defined by the depth includes an interconnected body of the superhard material.

24. A rock drilling bit of the cutting element of claim 20.

25. The rock drilling bit of claim 24, wherein the rock drilling bit is a drag bit.

26. A method of cutting a material, comprising contacting a surface of the material with at least a portion of the working surface of one or more cutting elements of claim 21.

27. The method of claim 26, comprising removing at least a portion of an iron group binder metal present in the layer of superhard material to the depth from the working surface of at least about 50 microns.

28. The method of claim 27, wherein the depth from the working surface is about 20 to about 250 microns.

29. The method of claim 26, wherein a region of the layer of superhard material defined by the depth includes an interconnected body of the superhard material.

30. The method of claim 27, wherein removing includes contacting the iron group binder metal with an acid for a time period sufficient to remove the iron group binder to the depth.

31. A method of cutting a material, comprises
   contacting a surface of the material with at least a portion of the working surface of one or more cutting elements of claim 1.

32. A method of manufacturing a cutting element, comprising:
   sintering a superhard material to a substrate along an interface in a high pressure/high temperature (HPHT) process,
   wherein the substrate prior to substrate sintering is doped with a grain growth inhibitor or a metallic carbide other than WC,
   wherein, during substrate sintering, the metallic carbide other than WC is transformed to an elemental form,
   wherein, during sintering, carbon from the grain growth inhibitor or from the metallic carbide other than WC dissolves and precipitates as WC or stays in solution upon cooling, and
   wherein the grain growth inhibitor concentration or the metallic carbide other than WC concentration at the interface is at a first concentration, and is at a second concentration away from the interface, wherein the second concentration is lower than the first concentration.

33. The method of claim 32, wherein the metal from the grain growth inhibitor, prior to sintering the substrate, is one or more of Cr, V, Ti, Nb, Mo, and Ta.

34. The method of claim 32, wherein the metallic carbide other than WC, prior to sintering the substrate, is one or more of $Cr_3C_2$, VC, $Mo_2C$ and TaC.

35. The method of claim 32, wherein the metal from the grain growth inhibitor is one or more of Cr and V and wherein the metal from the metallic carbide other than WC is one or more of Cr and V.

36. An abrasive compact, comprising:
   a body having a composition including (i) a superhard material, (ii) a metal from a metallic grain growth inhibitor or a metal from a metallic carbide other than WC, and (iii) an iron group binder metal, the body including a working surface at a first side and a base surface at a second side, the first side opposite the second side; and
   a substrate sintered to the body along the base surface,
   wherein the iron group binder metal concentration and the metal concentration from the metallic grain growth inhibitor or from the metallic carbide other than WC is at a first concentration at the base surface, and is at a second concentration away from the interface, wherein the second concentration is lower than the first concentration.

37. The abrasive compact of claim 36, wherein, in the body, the metal from the metallic grain growth inhibitor or the metal from the metallic carbide other than WC is present in an amount below a solubility limit of the metal in the iron group binder metal.

38. The abrasive compact of claim 36, wherein a concentration of the iron group binder metal and a concentration of the metal from the metallic grain growth inhibitor both decrease from the base surface toward the working surface.

39. The abrasive compact of claim 38, wherein the metal from the metallic grain growth inhibitor is one or more of Cr, V, Ti, Nb, Mo, and Ta.

40. The abrasive compact of claim 37, wherein the metallic carbide other than WC is one or more of $Cr_3C_2$, VC, $Mo_2C$ and TaC.

41. The abrasive compact of claim 38, wherein the metal from the metallic grain growth inhibitor is one or more of Cr and V and wherein the metal from the metallic carbide other than WC is one or more of Cr and V.

42. The abrasive compact of claim 38, wherein the superhard material is polycrystalline diamond, the metal from the metallic grain growth inhibitor or the metal from the metallic carbide other than WC is one or more of Cr and V, and the iron group binder metal is Co.

43. A cutting element comprising the abrasive compact of claim 38.

44. A rock drill bit comprising the abrasive compact of claim 38.

45. The rock drilling bit of claim 44, wherein the rock drilling bit is a drag bit.

* * * * *